United States Patent
Yamasaki

(10) Patent No.: US 7,039,778 B2
(45) Date of Patent: May 2, 2006

(54) DATA BACKUP METHOD IN A NETWORK STORAGE SYSTEM

(75) Inventor: Yasuo Yamasaki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 326 days.

(21) Appl. No.: 10/641,054

(22) Filed: Aug. 15, 2003

(65) Prior Publication Data

US 2004/0236984 A1    Nov. 25, 2004

(30) Foreign Application Priority Data

May 20, 2003   (JP)   ............... 2003-141293

(51) Int. Cl.
*G06F 12/16* (2006.01)
(52) U.S. Cl. ............... 711/162; 711/112; 707/204
(58) Field of Classification Search ............... None
See application file for complete search history.

(56) References Cited

U.S. PATENT DOCUMENTS

| | | | |
|---|---|---|---|
| 5,325,509 A * | 6/1994 | Lautzenheiser | 711/137 |
| 5,734,818 A * | 3/1998 | Kern et al. | 714/20 |
| 5,893,140 A | 4/1999 | Vahalia et al. | |
| 5,907,672 A * | 5/1999 | Matze et al. | 714/8 |
| 6,081,807 A * | 6/2000 | Story et al. | 707/101 |
| 6,085,298 A * | 7/2000 | Ohran | 711/162 |
| 6,260,125 B1 | 7/2001 | McDowell | |
| 6,324,654 B1 * | 11/2001 | Wahl et al. | 714/6 |
| 6,549,992 B1 * | 4/2003 | Armangau et al. | 711/162 |
| 6,662,197 B1 * | 12/2003 | LeCrone et al. | 707/204 |
| 6,842,825 B1 | 1/2005 | Geiner et al. | |
| 2002/0065999 A1 * | 5/2002 | Kikuchi et al. | 711/162 |
| 2004/0064488 A1 | 4/2004 | Sinha | |
| 2005/0005070 A1 | 1/2005 | Lam | |
| 2005/0071393 A1 | 3/2005 | Ohno et al. | |

* cited by examiner

*Primary Examiner*—Matthew D. Anderson
*Assistant Examiner*—Michael Krofcheck
(74) *Attorney, Agent, or Firm*—Mattingly, Stanger, Malur & Brundidge, P.C.

(57) ABSTRACT

In a data backup method in a network storage system in which mirroring is conducted between two disk units, the mirroring is delayed by accumulating update data in a cache for a predetermined period of time. When storing the update data in the cache, files are related to each other, and information of file open and close is also stored. The update data is reflected in the mirrored disk using the file open and close information. As a result, the contents of the mirrored disk are delayed for a predetermined period of time from those of the primary disk, and all files are in other than the open state. Within a range of the period to store data in the cache, it is possible to restore data created at a point of time preceding a desired period of time. This enables recovery if a user erases files by mistake.

3 Claims, 17 Drawing Sheets

FIG. 8

UPDATE LOG TABLE

| TIME | FILE NAME | TYPE | RANGE | DATA |
|---|---|---|---|---|
| 10:01 | /tmp/PAT.doc | open | | |
| 10:02 | /etc/passwd | open | | |
| 10:03 | /tmp/PAT.doc | write | 0 ~ 4095 | 0x1F0C2487··· |
| 10:04 | /tmp/PAT.doc | write | 4096 ~ 8191 | 0x02CC248A··· |
| 10:05 | /etc/passwd | write | 512 ~ 1023 | 0xFF1F0C24··· |
| 10:06 | /tmp/PAT.doc | close | | |
| 10:07 | /tmp/PAT.doc | open | | |
| 10:08 | /etc/passwd | write | 0 ~ 511 | 0x24871F0C··· |
| 10:09 | /tmp/PAT.doc | write | 0 ~ 4095 | 0x0C241F87··· |
| 10:10 | /tmp/PAT.doc | write | 4096 ~ 8191 | 0x4871F0C2··· |
| 10:11 | /etc/passwd | write | 2048 ~ 2560 | 0x187F0C24··· |
| 10:12 | /tmp/PAT.doc | close | | |
| 10:13 | /etc/passwd | close | | |

163    164    165    166    167

OPERATION SCREEN EXAMPLE OF CLIENT COMPUTER

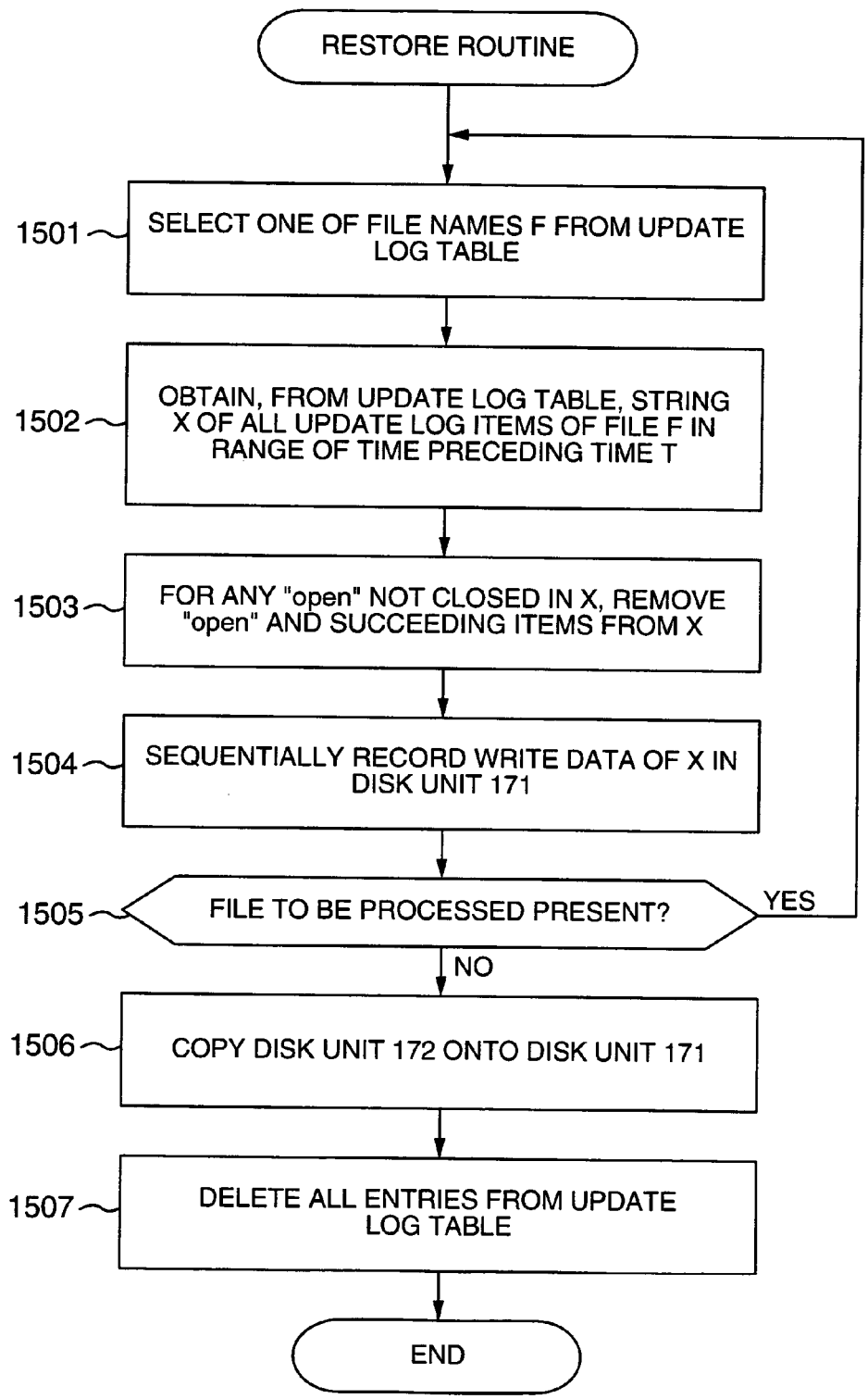

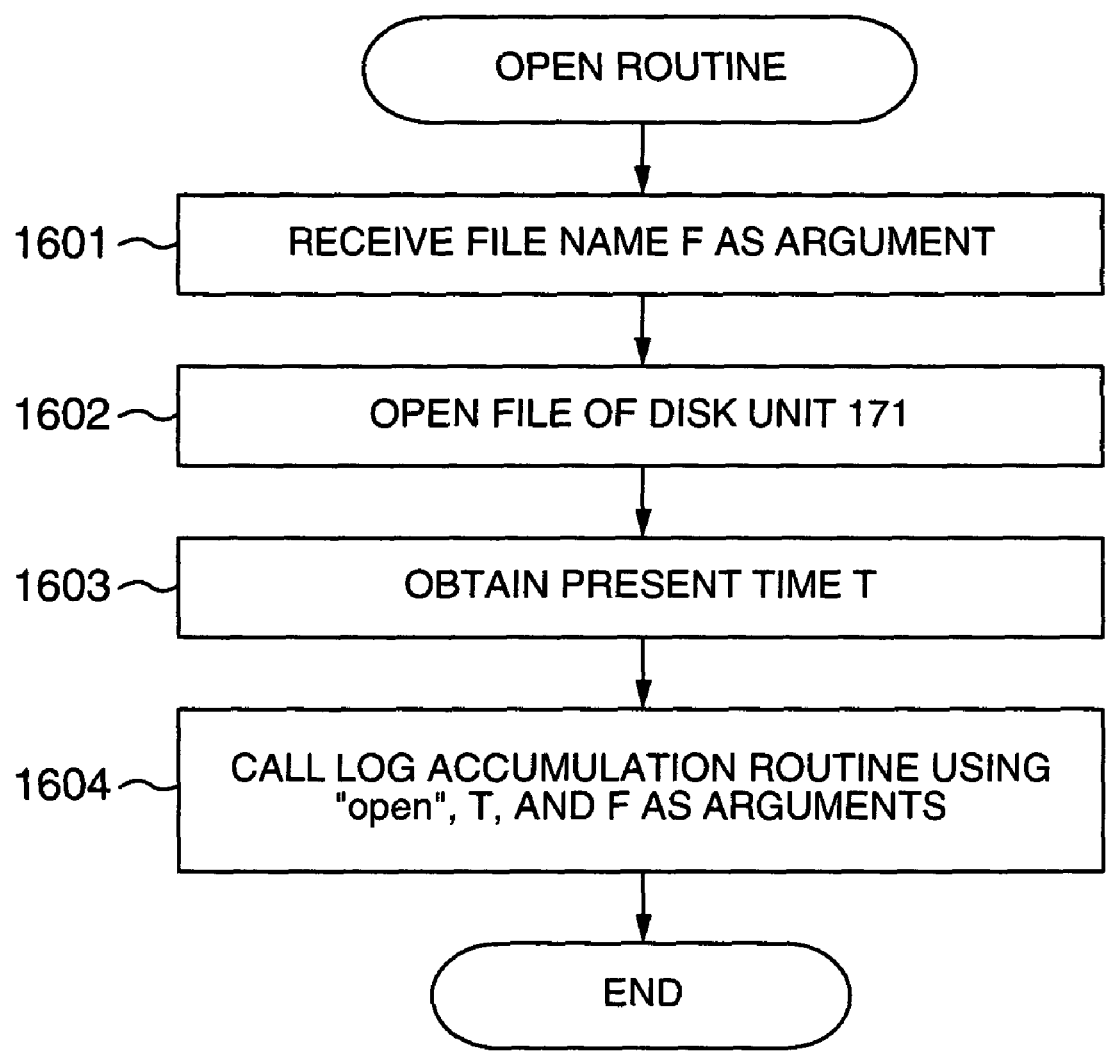

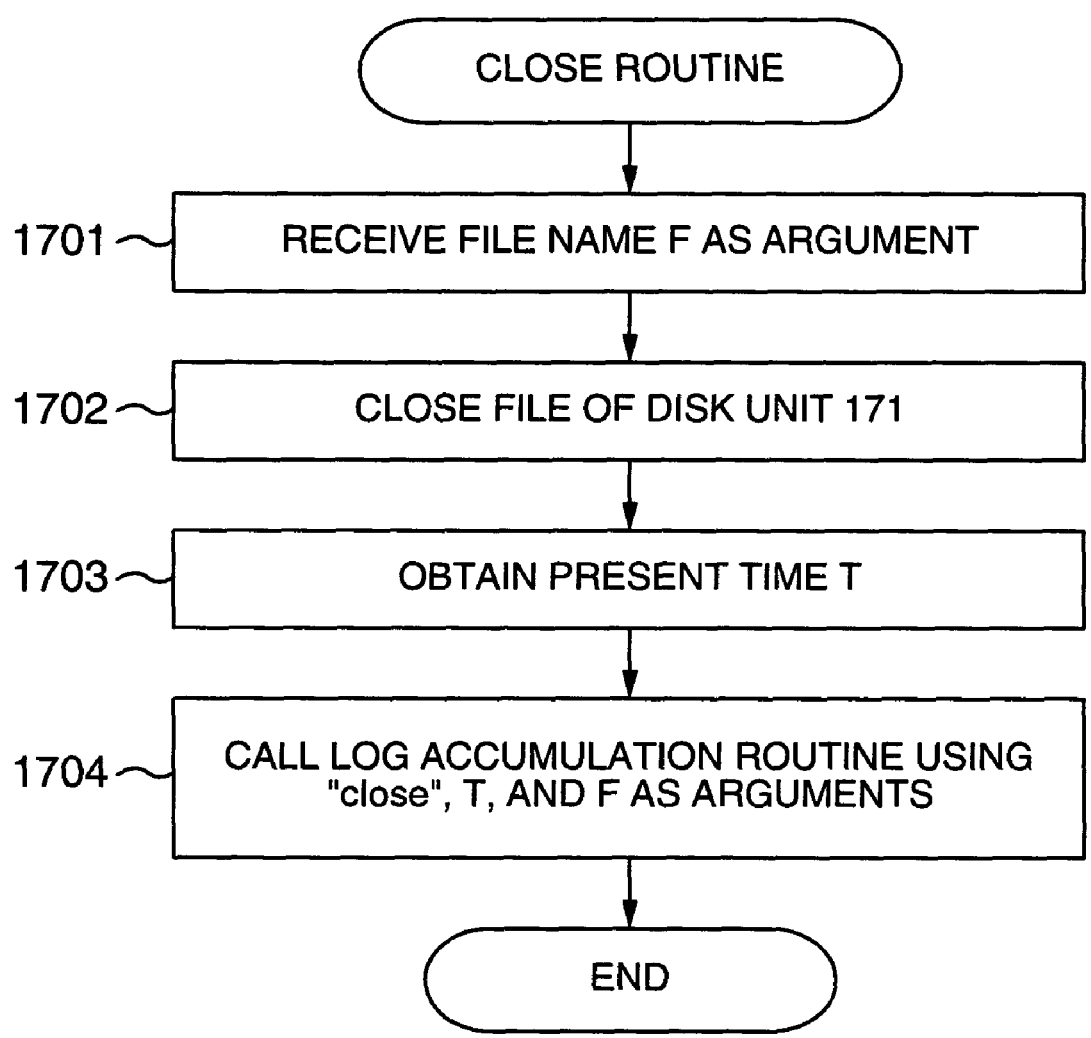

DATA BACKUP METHOD IN A NETWORK STORAGE SYSTEM

BACKGROUND OF THE INVENTION

The present invention relates to a method of achieving backup and recovery of file data in a network file server or a network storage system, and in particular, to a backup method using mirroring and a snapshot.

In U.S. Pat. No. 6,260,125, storage system data backup mainly includes offline backup and online backup. The online backup includes mirroring and a snapshot. Description will now be given of an outline of each backup. The offline backup is a technique in which a server connected to a storage system is stopped and backup of the storage system is conducted for each volume. Typically, this is conducted every day in the night after the jobs of the day are completed.

The mirroring is a technique to copy the contents of a volume onto another mirrored volume in a continuous fashion. To start the mirroring, a mirrored volume is first initialized using the contents of an active volume. When the initialization is finished, the mirroring is started by writing data stored in the active volume in the mirrored volume. In this operation, the data written in the active volume during the initialization is also mirrored in the mirrored volume. The storage apparatus conducts data coherence control to prevent an operation in which initialization data is written over the new mirrored data.

The snapshot is a backup technique to replicate a volume at a predetermined point of time. The snapshot includes a snapshot by a storage apparatus and a snapshot by a server. The snapshot by a storage apparatus is implemented using the mirroring and is hence also called "split mirror". As in the initialization in the mirroring, the contents of an active volume are copied onto a snapshot volume. In the operation, when the contents of the active volume are changed, old data is mirrored in the snapshot volume. The storage apparatus conducts data coherence control. In the snapshot by a server, the volume is divided into areas each of which is called generation, and then change points in a predetermined range of time are collected in a group of an associated one of the generations. A snapshot at a point of time can be created by collecting generations preceding the point of time.

The storage system data backup can be classified as above.

On the other hand, U.S. Pat. No. 6,260,125 describes a new mirroring method, i.e., an asynchronous mirroring method. This method has an aspect that mirror data is kept staying for a predetermined period of time in a queue disposed between a volume and a mirrored disk. Assume in the present specification that the operation in backup processing between the volume and the mirrored disk to keep the mirror data for a predetermined period of time between a volume and a mirrored disk is referred to as "asynchronous mirroring".

Description will now be given of disadvantages of the respective backup techniques.

In the offline backup, since applications of the server are normally terminated before the backup is started, it is advantageous that the restored file can be normally used by the applications. However, the backup is conducted for each volume and hence the user cannot restore the storage system for each file. Therefore, this leads to a disadvantage of increase in the operation cost to recover user's operation misses. Since the application jobs are stopped, it is inevitable that the backup is conducted at a long interval such as an interval of one day, and hence files recently created cannot be restored.

At failure of a disk in the mirroring system, latest data immediately before the failure can be restored. However, for example, data which is created 20 minutes before the mirroring and which is lost ten minutes therebefore cannot be restored. As distinct from the offline backup, the backup of the mirroring system is conducted without stopping the application, and hence the backup is also conducted for a file being written. As a result, the application cannot use the file again in many cases. As in the offline backup, the user can neither conduct the recovery nor restore the storage for each file.

As for the snapshot by the storage apparatus or the server, when the snapshot is created at a plurality of points of time, data can be restored at either one of the points of time. This is similar to the offline backup in that the backup is conducted by separating the storage apparatus from the server. However, since the application is not normally terminated, it is not guaranteed for the application to use the files again. The user can neither conduct the recovery nor restore the storage for each file.

The snapshot by the storage apparatus creates a complete replica of a volume and hence increases tolerance for failure. However, since a large amount of input/output data is required, performance of the storage system considerably decreases. The snapshot interval cannot be minimized to a satisfactory extent.

The snapshot by the server does not create a complete replica of a volume and hence decreases tolerance for failure. However, no load is imposed on the storage apparatus. Since the server can provide an interface for each snapshot, the recovery can be conducted for each file by the user's operation.

The method using the asynchronous mirroring described in U.S. Pat. No. 6,260,125 is advantageous in that data at any point of time within a predetermined range of time can be restored using the mirrored volume and the queue. However, the recovery by the user's operation and the storage recovery for each file are not possible. It is not guaranteed for the application to use the file again.

The techniques described above are useful in the recovery of the entire volume at storage failure. However, none of the techniques can recover a typical user miss described below.

The typical user miss is an operation miss such as a miss in which the user deletes by mistake a file created 30 minutes before. In the techniques described above, it is required to guarantee that a file erroneously deleted can be restored by the user's operation to be used again by the application.

In the techniques, the restoration points are dispersed, the restoration requires operation of a storage manager, and/or the application is stopped depending on cases. Even when the file restoration is conducted, the application cannot use the file again in some cases. That is, all conditions are not satisfied at the same time.

SUMMARY OF THE INVENTION

It is therefore an object of the present invention to provide a backup method suitable for the recovery of the user's miss described above.

To achieve the object above, an information processing system according to the present invention includes a processor, a memory, a first disk unit, a second disk unit, a first unit to conduct asynchronous mirroring of data from the first disk unit to a second disk unit, a second unit to record open and close information of files of the first disk unit in the memory, and a third unit to use the open and close information of the files in the asynchronous mirroring.

Each means may be hardware or software executed on a processor. According to the configuration, it is possible to discriminate that a file in the memory to be mirrored is closed after it is opened (rewritten) or the file is kept opened (being rewritten).

According to one aspect of the present invention, the backup is conducted onto the second disk unit for each file already rewritten. This facilitates the recovery by the user's operation and the recovery for each file. It is guaranteed for the application to use the backup file again.

The memory can store information of open and close of files, update locations of files, and information regarding the contents of update of files. The memory may be a memory such as a dynamic random access memory (DRAM) and/or part of the first or second disk units.

By handling open and close information of the memory regardless of the open and close of files in the first disk unit, it is possible in the memory to create a file which is closed after it is opened (that is, a file already rewritten). Therefore, even when the first disk unit is being rewritten for a long period of time, the backup can be conducted in a short period of time using the rewritten file as the unit of backup.

It is also possible to additionally provide a function in which a file is opened in the first disk unit and is then forcibly closed within a predetermined period of time. In the configuration, the rewrite time becomes a finite period of time. Therefore, the backup period from the memory to the second disk unit using the rewritten file as the backup unit can be limited.

By disposing a third disk unit to copy thereonto the information stored in the memory, it is possible to prevent an event in which part of update data is ignored due to insufficient capacity of the memory.

The asynchronous mirroring can be conducted not in the unit of each volume (disk) but in the unit of each directory. This leads to higher reliability.

According to one aspect of the backup method of the present invention for use in a system including a processor, a memory, and a disk unit in which the backup is conducted for the contents of the disk unit, the method includes a first step for buffering update of the disk apparatus in a memory area, a second step for recording open and close information of a file in the memory, and a third step for using the file open and close information in an operation to control the backup.

According to one aspect of the present invention, in an information processing system including a processor, a first storage apparatus to be accessed by the processor, a second storage apparatus to be accessed by the processor, and a third storage apparatus, the processor includes a control unit to conduct a backup operation from the first storage apparatus to the second storage apparatus, the third storage apparatus includes update history or log of the first storage apparatus and open and close information of files, and the control unit conducts a rewriting operation in the second storage apparatus using the update log of the first storage apparatus and the open and close information of files. Preferably, the control unit prevents a write operation of a file, which is opened and which is not closed yet, in the second storage apparatus using the update log of the first storage apparatus and the open and close information of files.

The update log may include a storage location of the information, information of the contents of update, and time of update.

Description will now be given in detail of typical operation of the backup and recovery method according to the present invention. Assume that a system includes a processor connected to a network to provide a file access service, a cache connected to the processor, and a storage which includes a first disk and a second disk and which is connected to the cache. The file access service includes services to receive and to process an open request to open a file, a read request to read data from a file at present or a file in the past, a write request to write data in a file, a close request to close a file, and a restore request to restore the entire contents of a disk in the past. When the write request is received, the processor writes update data on the first disk and also writes the update data and meta-information regarding the update such as an update file name in the cache. When the processor is periodically activated, the processor writes in the second disk the update data accumulated in the cache. In the operation, by selecting the update data, the processor keeps a state in which the contents of the first disk are delayed for a predetermined period of time from those of the first disk and the files in the second disk are not opened. When the read request is received, the processor makes a check to determine whether the time of the file in the request is "present" or "past". If the time is "present", the processor reads a file from the first disk. If the time is "past", the processor reconstructs a file in the past using the second disk and the cache. When the restore request is received, the processor restores the latest disk contents in the first disk using the second disk and the cache. In this operation, by selecting the update data from the cache, the processor keeps a state in which all files on the first disk are not opened. When the open request is received, the processor opens a file in the first disk unit and also writes an event of "open" and meta-information such as a file name in the cache. When the close request is received, the processor closes a file in the first disk unit and also writes an event of "close" and meta-information such as a file name in the cache.

Other backup methods provided by the present application will be described below.

Other objects, features and advantages of the invention will become apparent from the following description of the embodiments of the invention taken in conjunction with the accompanying drawings.

BRIEF DESCRIPTION OF THE DRAWINGS

FIG. 8 is a diagram showing a layout example of an update log table.

FIG. 15 is a flowchart of a restore routine.
FIG. 16 is a flowchart of an open routine.
FIG. 17 is a flowchart of a close routine.

DESCRIPTION OF THE EMBODIMENTS

Figure 1:
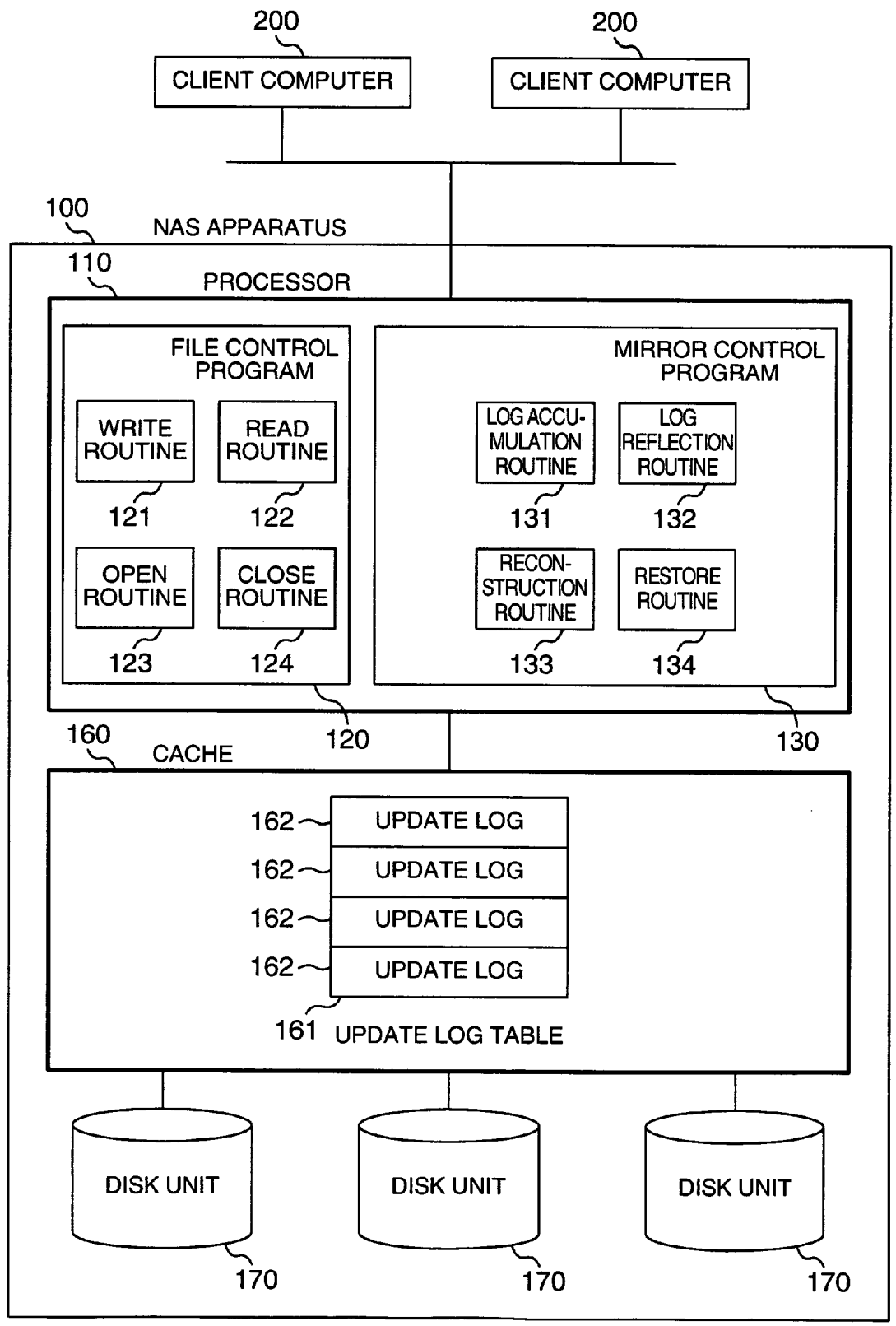
FIG. 1 is a block diagram for explaining a configuration of a first embodiment of a computer system according to the present invention.

Referring now to the drawings, description will be given of an embodiment of a backup method according to the present invention.

1. First Embodiment

The embodiment is a network attached storage (NAS) apparatus to conduct backup using asynchronous mirroring. The NAS apparatus is constructed by adding a file server function to a storage. In the NAS apparatus of the embodiment, the user can easily obtain a desired file in the past, a file created about ten minutes to about 60 minutes before, and the application can correctly open a desired file.

FIG. 1 shows a system configuration of the embodiment. An NAS apparatus 100 is a network file server to process a file access request from a client computer 200 connected to a network. The apparatus 100 includes a processor 110, a cache 160, and disk units 170. The processor 110 is connected to the cache 160, and the cache 160 is connected to the disk units 170.

On receiving a file access request from the client computer 200, the processor 110 accesses the disk unit 170 via the cache 160 and returns a result of the access to the client computer 200. The cache 160 includes a nonvolatile memory and most of the area thereof is used as a cache memory to increase the access speed to access the disk unit 170. However, part thereof is used as an update log table 161. The table 161 is a data structure to implement the asynchronous mirroring and includes a plurality of update log items 162. A file control program 120 to process file accesses and a mirror control program 130 to conduct the mirroring operate on the processor 110.

The file control program 120 includes a write routine 121 to write data in a file, a read routine 122 to read data from a file, an open routine 123 to open a file, and a close routine 124 to close a file. The mirror control program 130 includes a log accumulation routine 131 to accumulate file update information, a log reflection routine 132 to mirror the file update information, a reconstruction routine 133 to read data from a past file, and a restore routine 134 to restore a disk using a mirrored disk.

Figure 2:
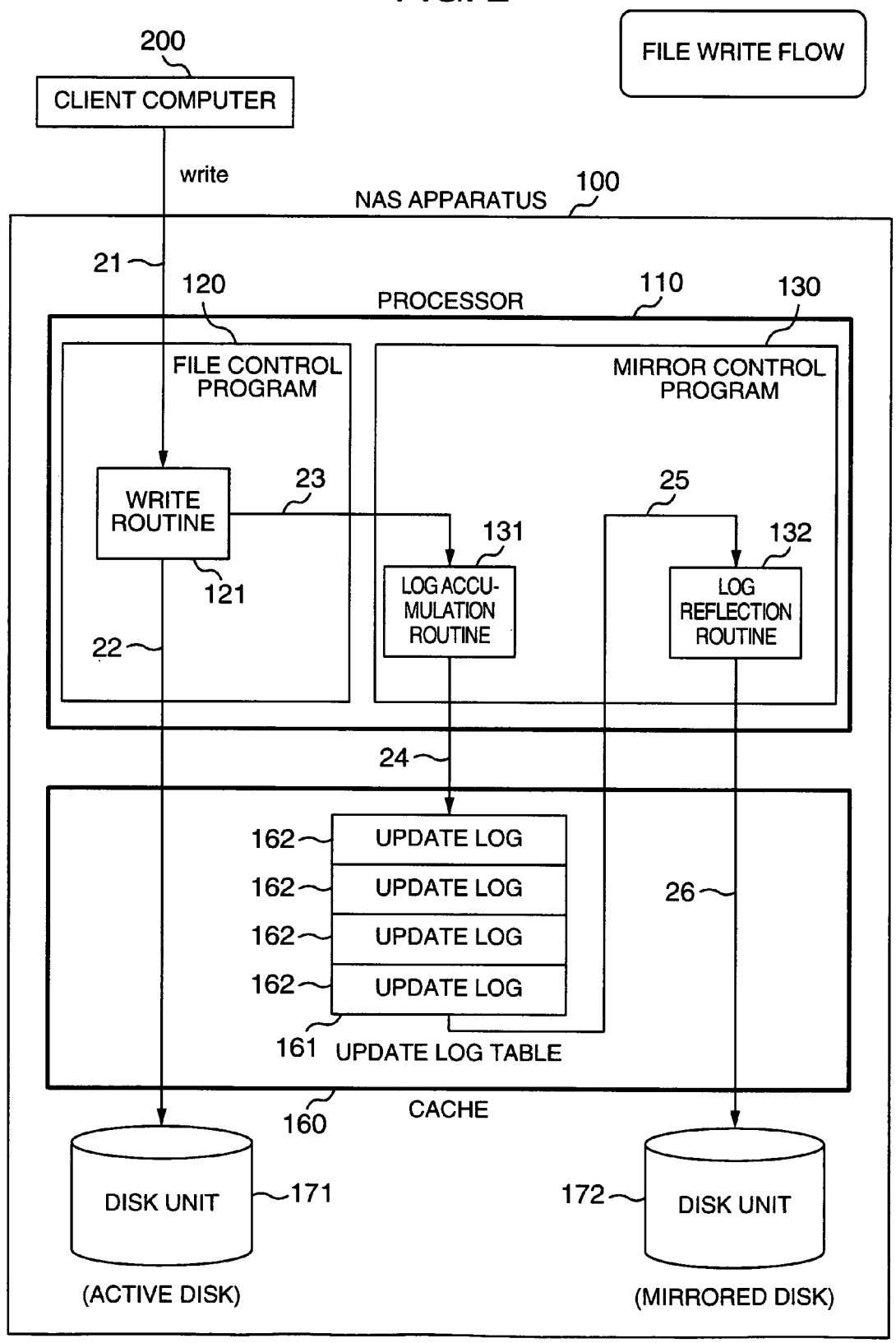
FIG. 2 is a block diagram for explaining a flow of processing to write data in a file.

FIG. 2 shows an outline of processing of the NAS apparatus 100 when a file write request is received from the client computer 200. When the write request is received from the client computer 200 (21), the write routine 121 outputs data to an active disk 171 used for an ordinary operation (22) and then notifies the write request also to the log accumulation routine 131 (23). When the write request is notified, the routine 131 accumulates the write request in the update log area 162 of the update log table 161 (24). The update reflection routine 132 is activated at an interval of ten minutes and outputs, to a mirrored disk 172 used for the mirroring, update log items 162 created in the update log table 161 at least 60 minutes before the present time to keep the mirrored disk 172 in a state which existed 60 minutes before the present time (25, 26). In the operation, the update reflection routine 132 does not use update log items regarding files being written to thereby keep each file in a state other than the "being written" state on the mirrored disk 172. In this connection, "a file being written" indicates a file which is opened and which is not closed yet. That is, any file is in a closed state on the mirrored disk 172.

Figure 3:
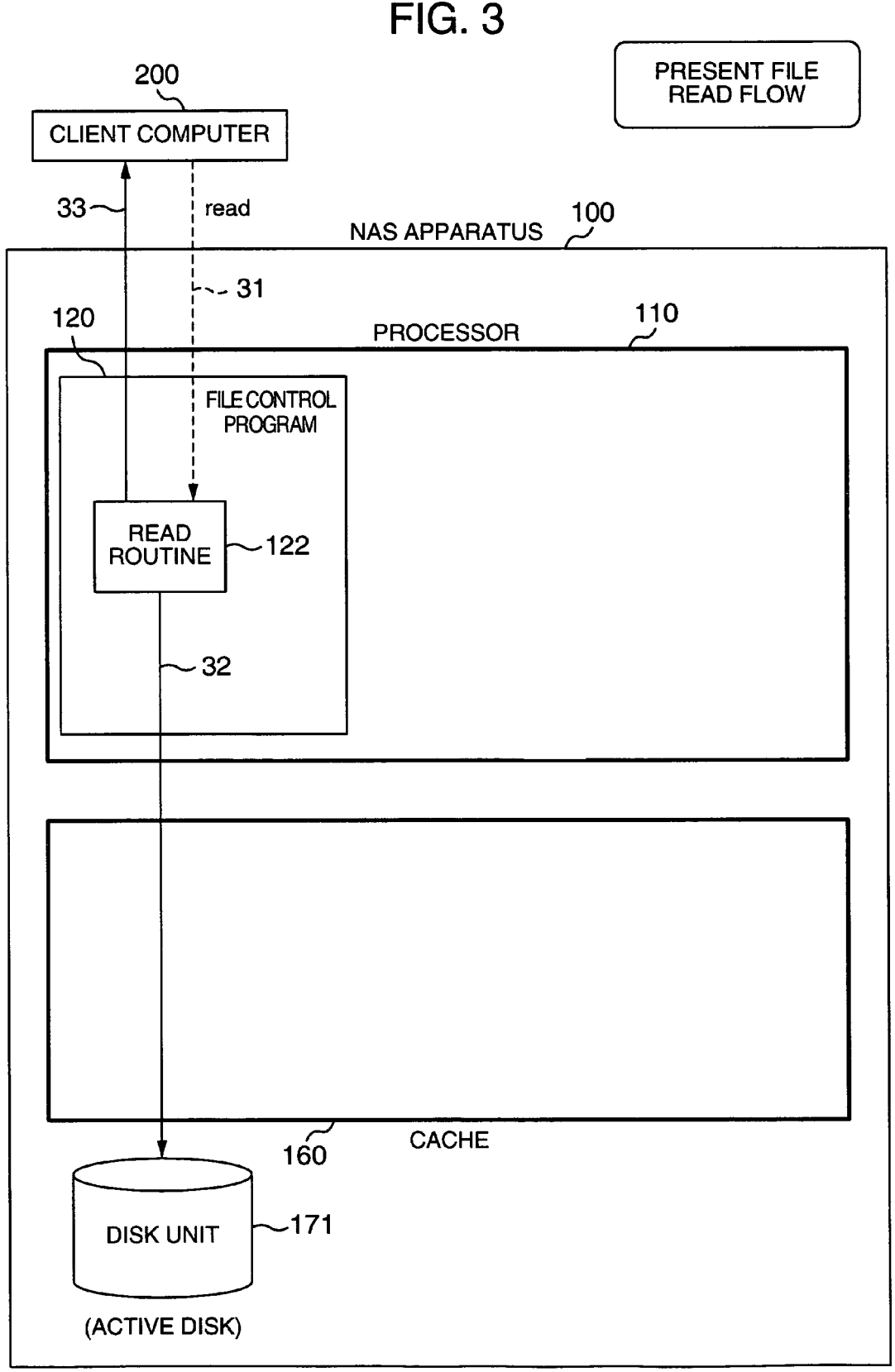
FIG. 3 is a block diagram for explaining a flow of processing to read a present file.

FIG. 3 shows an outline of processing of the NAS apparatus 100 when a file read request to read data from a present file is received from the client computer 200. When the write request for a present file is received from the client computer 200 (31), the read routine 122 reads data from the active disk 171 (32) and then returns the data to the client computer 200 (33).

Figure 4:
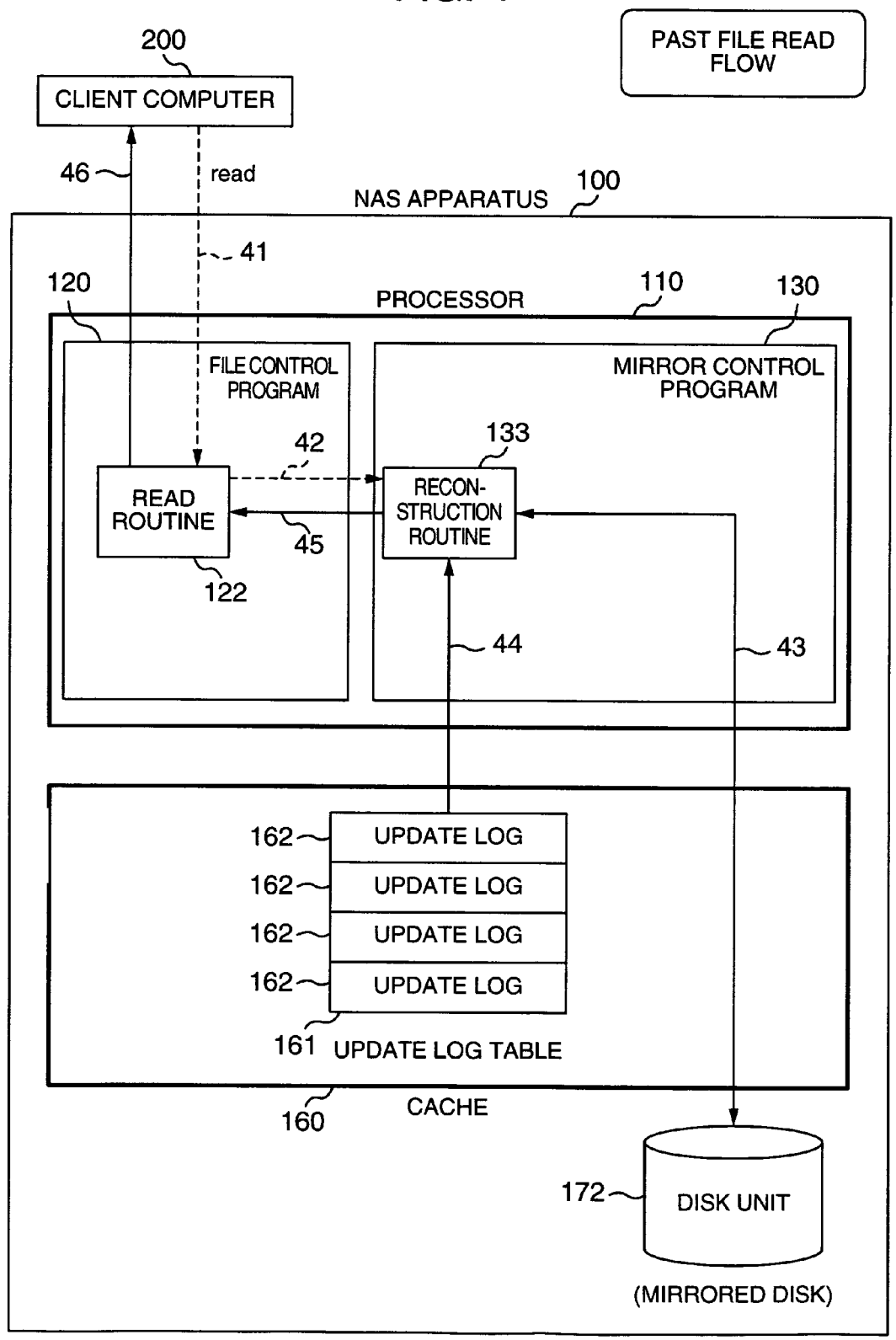
FIG. 4 is a block diagram for explaining a flow of processing to read a past file.

FIG. 4 shows an outline of processing of the NAS apparatus 100 when a file read request to read data from a past file is received from the client computer 200. When the write request for a past file is received from the client computer 200 (41), the read routine 122 notifies the read request to the reconstruction routine 133 (42). Having received the read request, the reconstruction routine 133 reads a file from the mirrored disk 172, sets the update log items 162 in a range of time preceding a specified time of the update log table 162 to the file (44), and returns the file to the read routine 122 (45). In the operation, the reconstruction routine 133 does not use the update log items 162 not closed and hence the past file thus read by the routine 133 is in a closed state, namely, other than in a "being written" state. The read routine 122 receives data returned from the reconstruction routine 133 and then sends the data to the client computer 200 (46).

Figure 5:
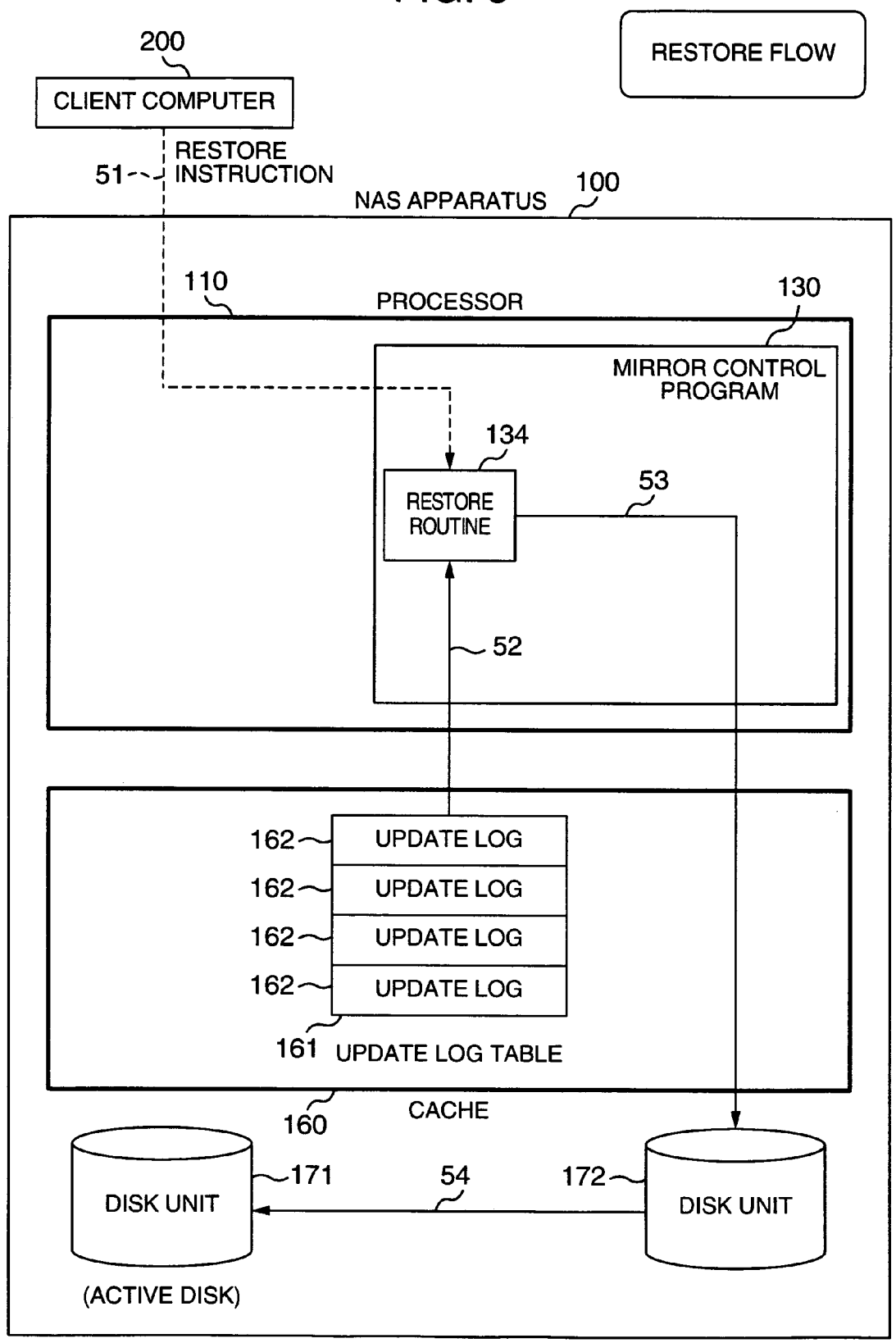
FIG. 5 is a block diagram for explaining a flow of processing to restore a disk using a mirrored disk.

FIG. 5 shows an outline of processing of the NAS apparatus 100 when a restore instruction to restore a disk using a mirrored disk is received from the client computer 200. When the restore instruction is received from the client computer 200 (51), the restore routine 134 sets all update log items 162 of the update log table 161 to the mirrored disk 172 to establish the latest state of the disk 172 (52, 53). In the operation, the restore routine 134 does not use the update log items 162 for which files are not closed, and hence all files are in a closed state. Next, the restore routine 134 copies the contents of the mirrored disk 172 onto the active disk 171 to achieve restoration of the disk 171 (54). The routine 134 also initializes the contents of the update log table 161 to conduct the mirroring again.

Figure 6:
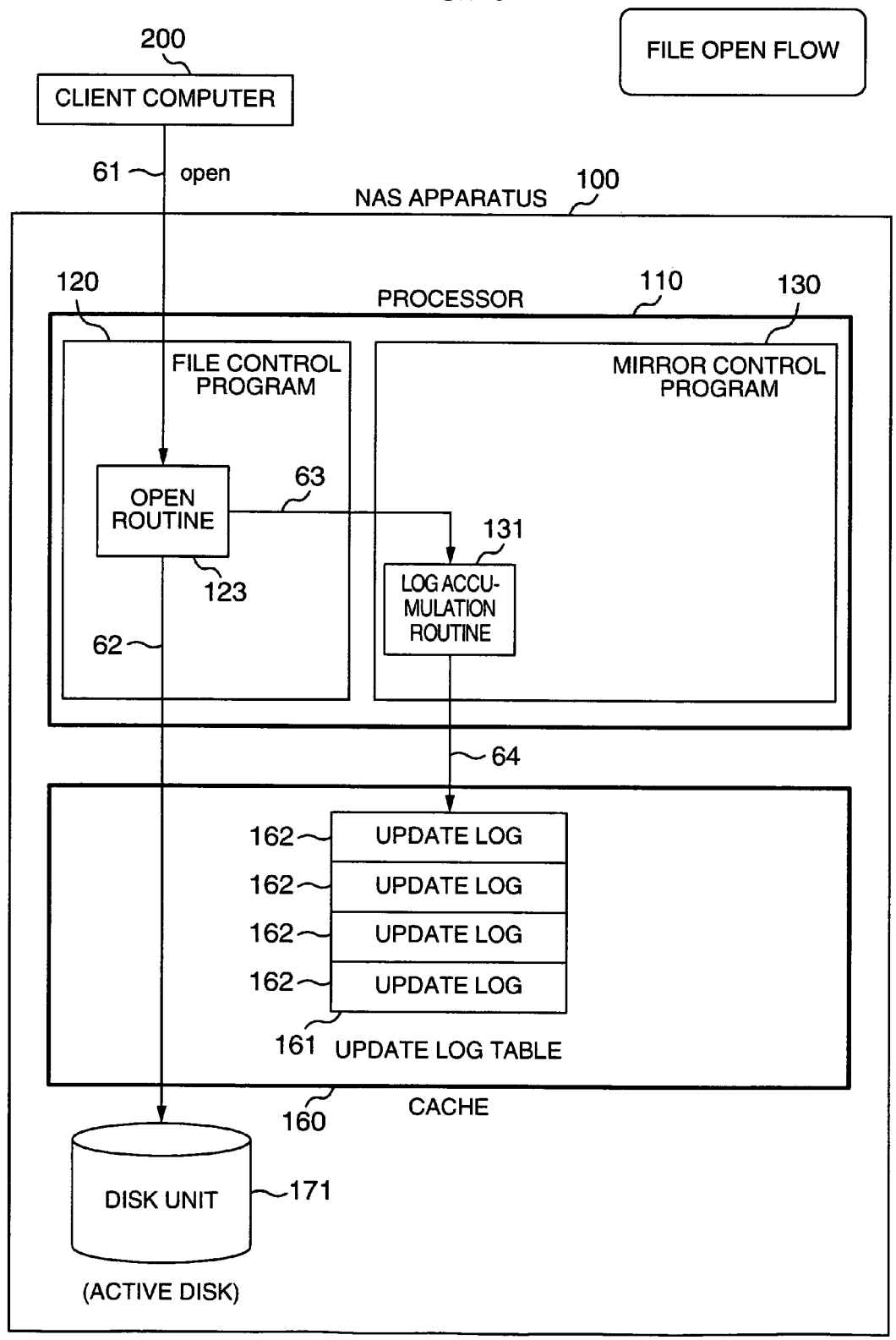
FIG. 6 is a block diagram for explaining a flow of processing to open a file.

FIG. 6 shows an outline of processing of the NAS apparatus 100 when a file open request is received from the client computer 200. When the file open request is received from the client computer 200 (61), the open routine 123 opens a file in the active disk 171 (62) and notifies the open request to the log accumulation routine 131 (63). Having received the open request, the routine 131 accumulates the open request in an update log item 162 of the update log table 161 (64).

Figure 7:
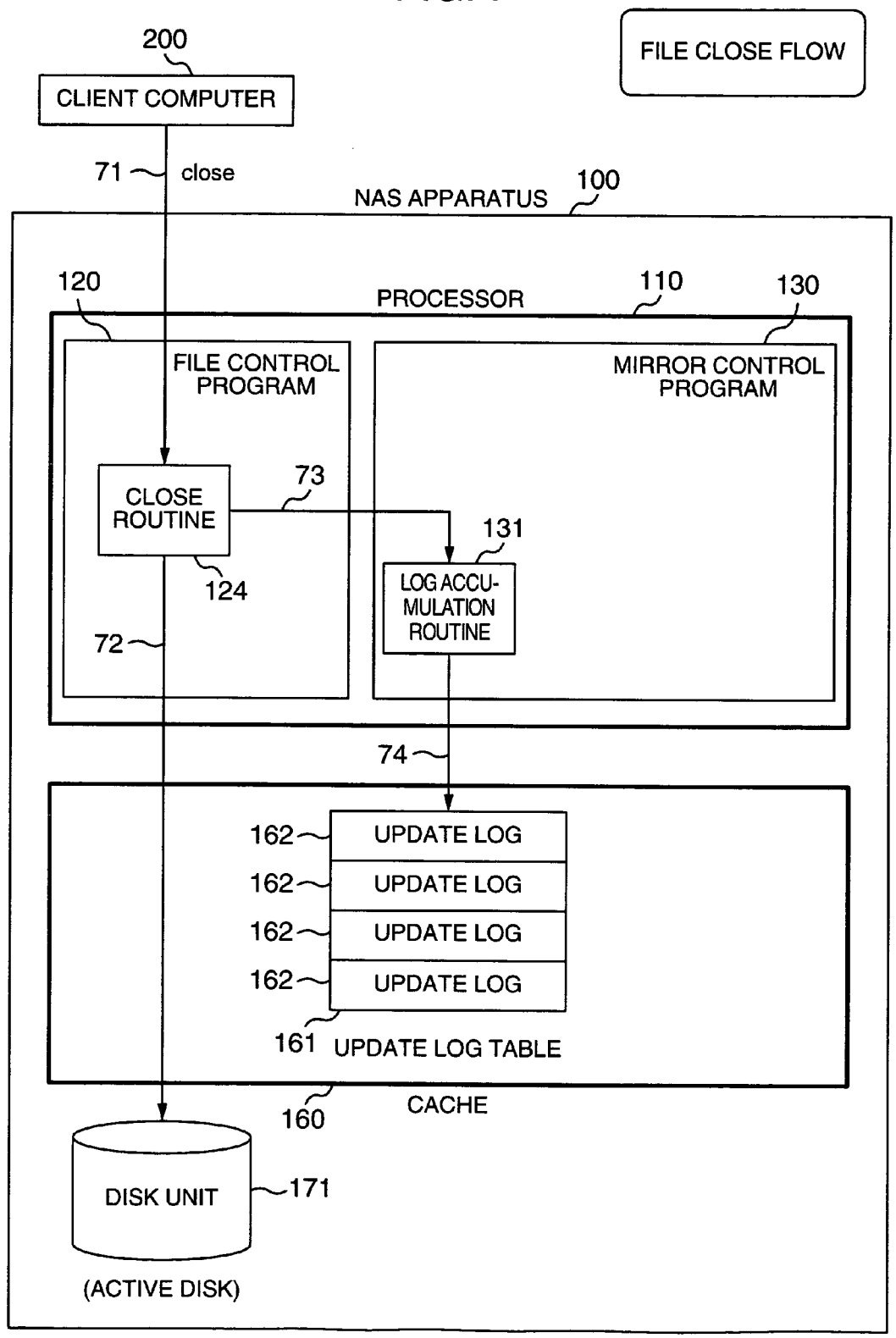
FIG. 7 is a block diagram for explaining a flow of processing to close a file.

FIG. 7 shows an outline of processing of the NAS apparatus 100 when a file close request is received from the client computer 200. When the close request is received from the client computer 200 (71), the close routine 124 closes a file in the active disk 171 (72) and notifies the close request to the log accumulation routine 131 (73). Having received the close request, the routine 131 accumulates the close request in an update log item 162 of the update log table 161 (74).

FIG. 8 shows a configuration and an example of utilization of the update log table 161 to keep file update information of the client computer 200. Each entry stores information regarding one update operation. A field 163 stores time of an update operation. A field 164 stores a file name as an object of the update. A field 165 stores a type of the update. This field store "write" for a file write operation, "open" for a file open operation, and "close" for a file close operation. Fields 166 and 167 are used only when the field 165 stores "write". The field 166 stores a file update range indicated by a pair of positions relative to a start point. The field 167 stored update data. In any situation, the entries are ordered in a sequence of time in the update log table 161.

Figure 9:
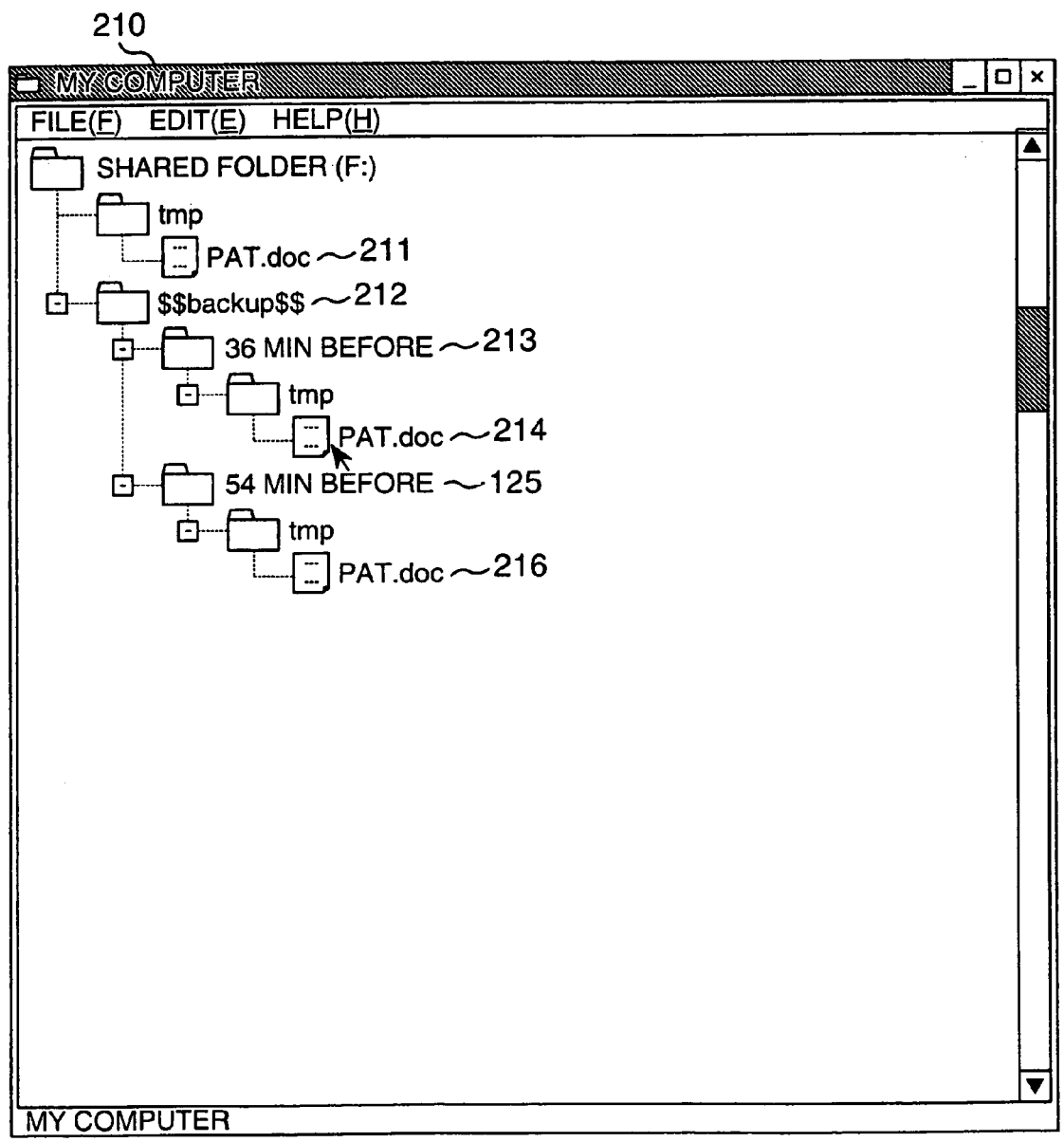
FIG. 9 is a diagram showing an example of a scan screen of a client computer.

FIG. 9 shows an example of an operation screen of the client computer 200. A screen 210 is used to browse the contents of the NAS apparatus 100 in which only a file called "/tmp/PAT.doc" exists. By accessing an icon 211, the operator can obtain the present data of the file /tmp/PAT.doc. The apparatus 100 continuously provides a special directory "$$backup$$" at a highest level of its directory hierarchy to access a past file. This is displayed as an icon 212 in the screen 210. When the operator creates a directory with a name of "time" below the special directory /$$backup$$, the system displays therebelow the contents of the disk at the point of time. However, the time must be in a range of past 60 minutes relative to the present time. An icon 213 indicates a highest directory of the disk 36 minutes before. The files therebelow are in a closed state, and no file is being written. By accessing a file 214, the operator obtains data of a file "/tmp/PAT.doc" created 36 minutes before. However, if the file is opened 30 minutes before and is kept opened, the operator obtains data before the file is opened. Similarly, by accessing an icon 125, the operator obtains a file "/tmp/PAT.doc" created 54 minutes before.

Figure 10:
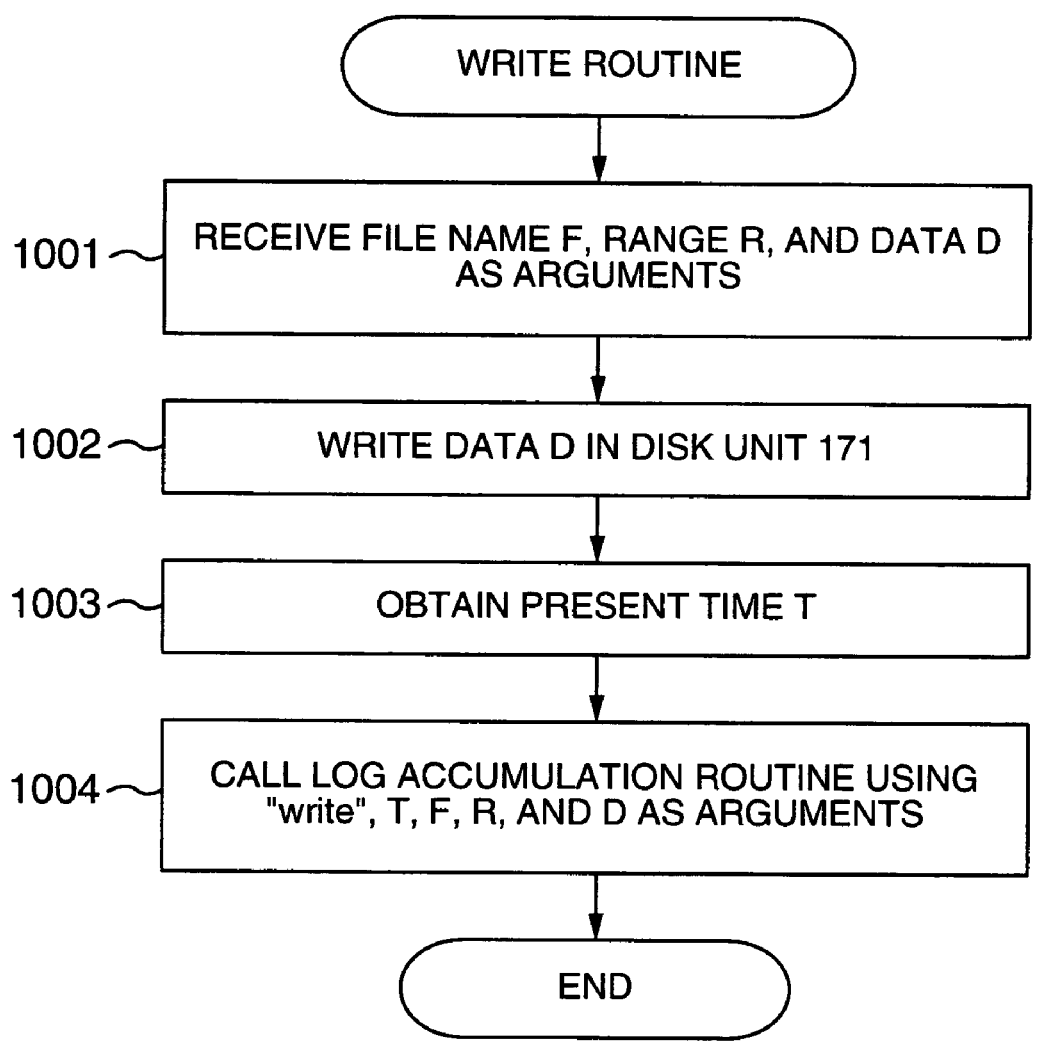
FIG. 10 is a flowchart of a write routine.

FIG. 10 shows a flowchart of the write routine 121. The routine 121 processes a file write request from the client computer 200. In step 1001, the routine 121 receives three arguments from the computer 200, that is, an objective file name F, a range R, and data D. In step 1002, to process the request from the client computer 200, the write routine 121 writes the data D on the active disk 171. In step 1003, the routine 121 obtains the present time T for a subsequent step. In step 1004, the routine 121 calls the log accumulation routine 131 to conduct the asynchronous mirroring. The routine 121 passes an update type "write", update time T, an update file name F, an update range R, and update data D as arguments to the log accumulation routine 131.

Figure 11:
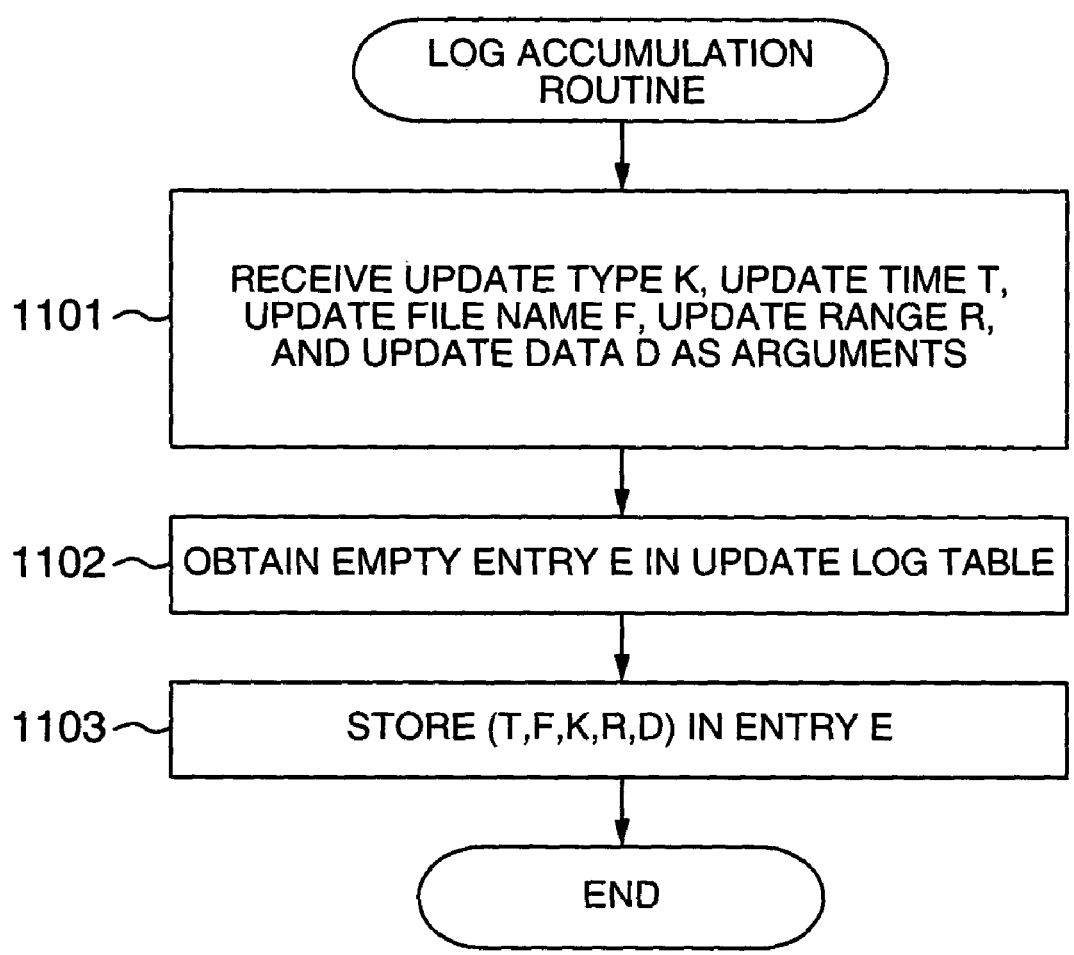
FIG. 11 is a flowchart of a log accumulation routine.

FIG. 11 shows a flowchart of the log accumulation routine 131. The routine 131 is called by three routines, namely, the write routine 121, the open routine 123, and the close routine 124 to accumulate update information of an associated file in the update log table 161. In step 1101, the routine 131 receives arguments including update information from the call source routine. The arguments include five items, namely, an update type K, update time T, an update objective file name F, an update range R, and update data D. However, none of the open routine 123 and the close routine 124 passes the update range R and the update data D. In step 1102, the routine 131 acquires one of the empty entries E of the update log table 161 to store the update information therein. When no empty entry is available, the log accumulation routine 131 executes processing similar to processing of the log reflection routine 132, which will be described later. As a result, an update log item 162 created at an appropriate point of time in advance is moved onto the mirrored disk 172 to thereby reserve an empty entry. In step 1103, the routine 131 stores the update information (K,T,F,R,D) in the entry E.

Figure 12:
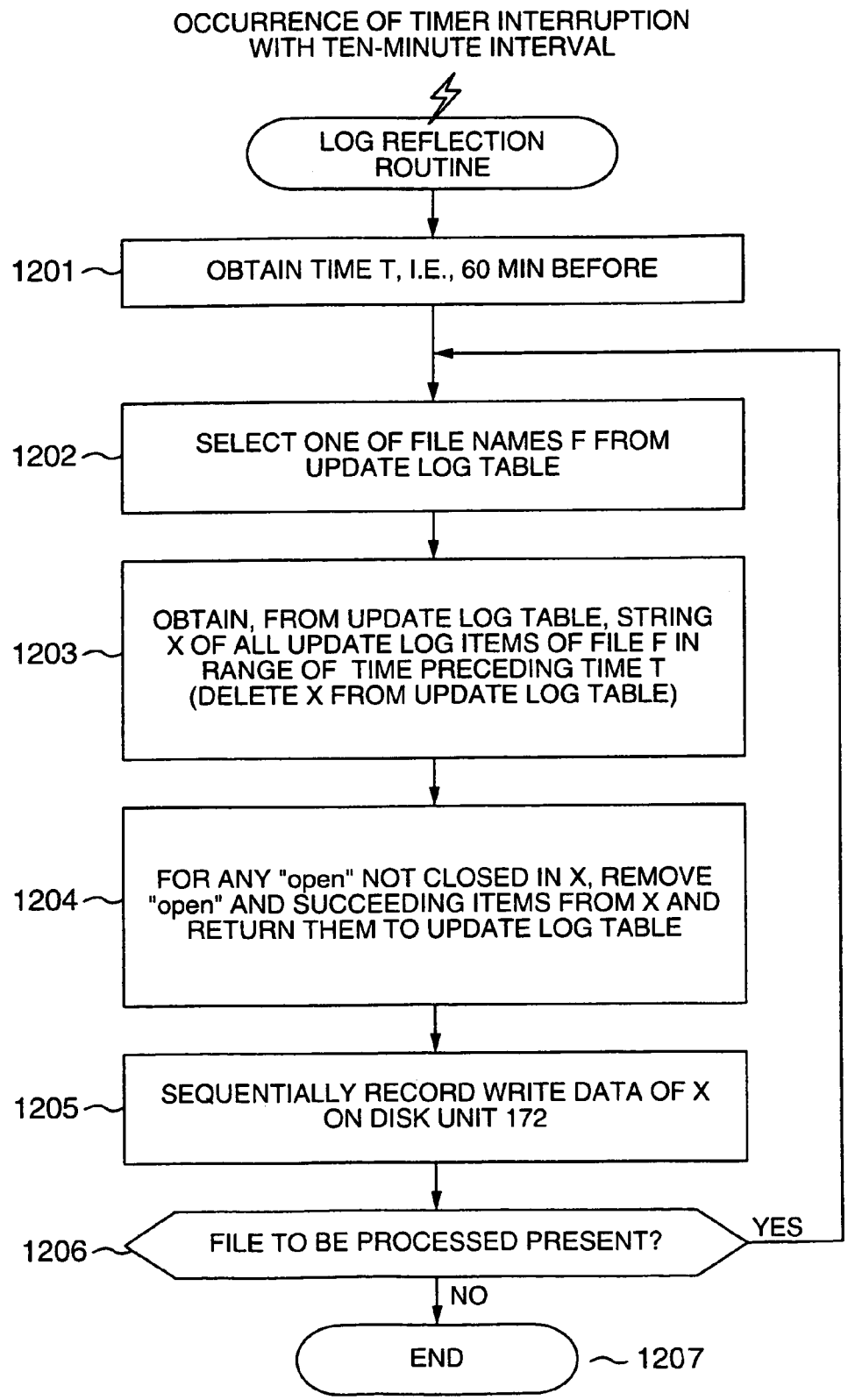
FIG. 12 is a flowchart of a log reflection routine.

FIG. 12 shows a flowchart of the log reflection routine 132. The routine is periodically called at an interval of ten minutes to continuously keep the mirrored disk 172 in a state one hour before by using appropriate part of the update information of the update log table 161. However, the files are set to a closed state. In step 1201, the routine 132 obtains time T one hours before the present time. In step 1202, the routine 132 selects one of the file names F from the fields 164 of the table 161. In step 1203, the routine 132 obtains from the table 161 a string X of all update log items of the file F created at a point of time before the time T. The routine 132 removes the update log string X from the table 161. In step 1204, if the string X includes "open" not closed, the items succeeding the "open" are update log items being written. The routine 132 removes the items from the string X to the update log table 161. In step 1205, the routine 132 sequentially records write data of the string X on the mirrored disk 172 to conduct the mirroring. In step 1206, the log reflection routine 132 makes a check to determine whether or not the table 162 includes a file to be processed. If there exists such a file, the process branches to step 1202 to repeat the processing. Otherwise, the process branches to step 1207.

Figure 13:
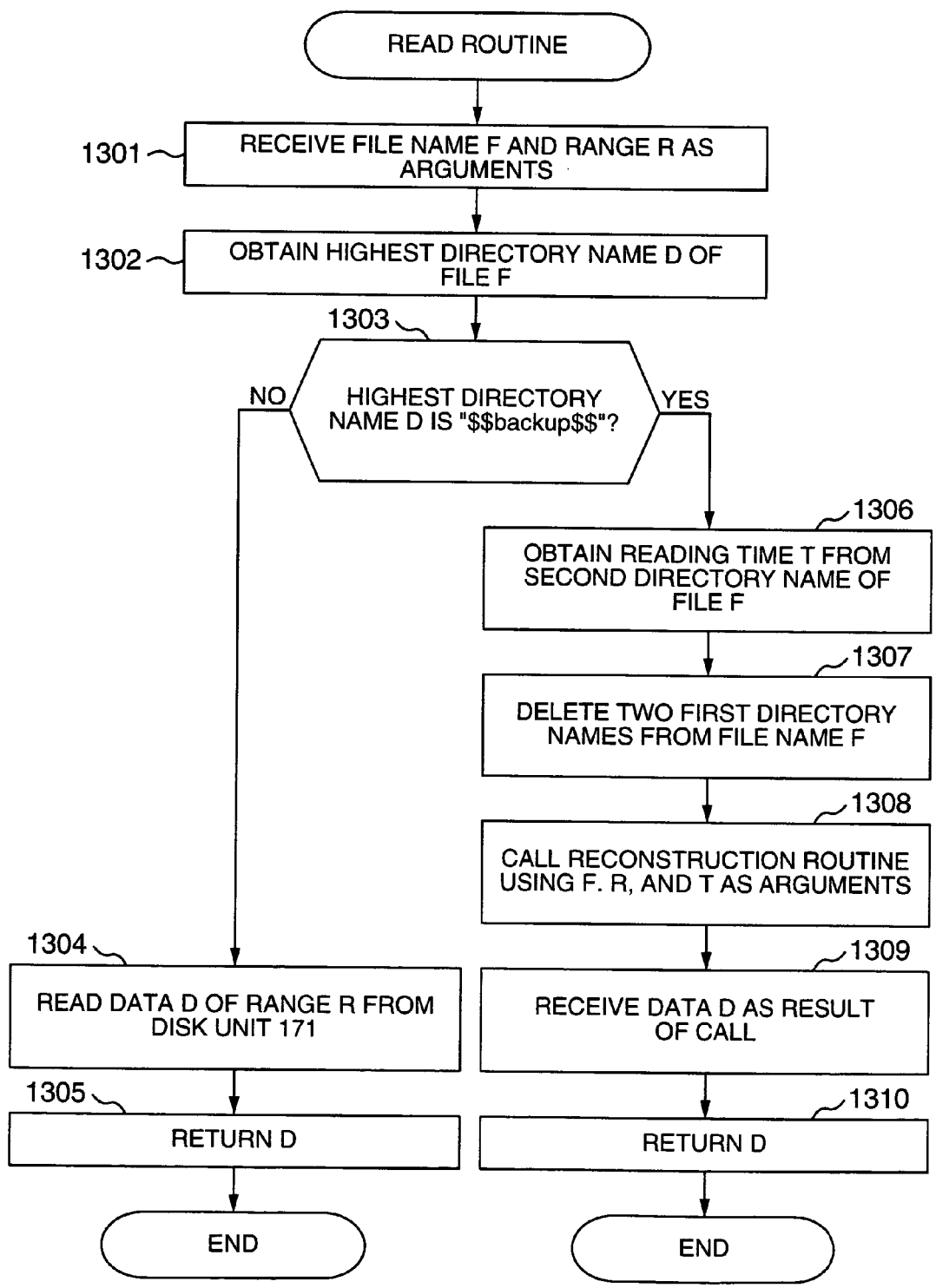
FIG. 13 is a flowchart of a read routine.

FIG. 13 shows a flowchart of the read routine 122. The routine 122 processes a file read request from the client computer 200. If the request is for a past file, the routine 122 calls the reconstruction routine 133. In step 1301, the read routine 122 receives arguments from the computer 200. The arguments are an objective file name F and a range R. In step 1302, to determine whether the objective file is a present file or of a past file, the routine obtains a highest directory name D of the file name F. In step 1303, the routine makes a check to determine whether or not the highest directory name D is "$$backup$$". If the name D is "$$backup$$", the process branches to step 1304 to read a present file. Otherwise, the process branches to step 1306 to read a past file. In step 1304, the routine 122 reads data D in the range R of the file F from the active disk 171. In step 1305, the routine 122 returns the data D to the client computer 200. In step 1306, the routine 122 obtains time T of an objective file using the file name F. For example, when the second directory name of the file name F is "ten minutes before", the time T is set to a point of time ten minutes before the present time. In step 1307, to obtain an actual file name, the routine 122 deletes the first and second directories from the file name F. In step 1308, to read a past file, the routine 122 calls the reconstruction routine 133. The routine 122 passes arguments including a file name F (after modification), a read range R, and file time T to the reconstruction routine 133. In step 1309, as a result of the call of the reconstruction routine 133, the read routine 122 obtain the data D of the file at the time T. In step 1310, the routine 122 passes the data to the client computer 200.

Figure 14:
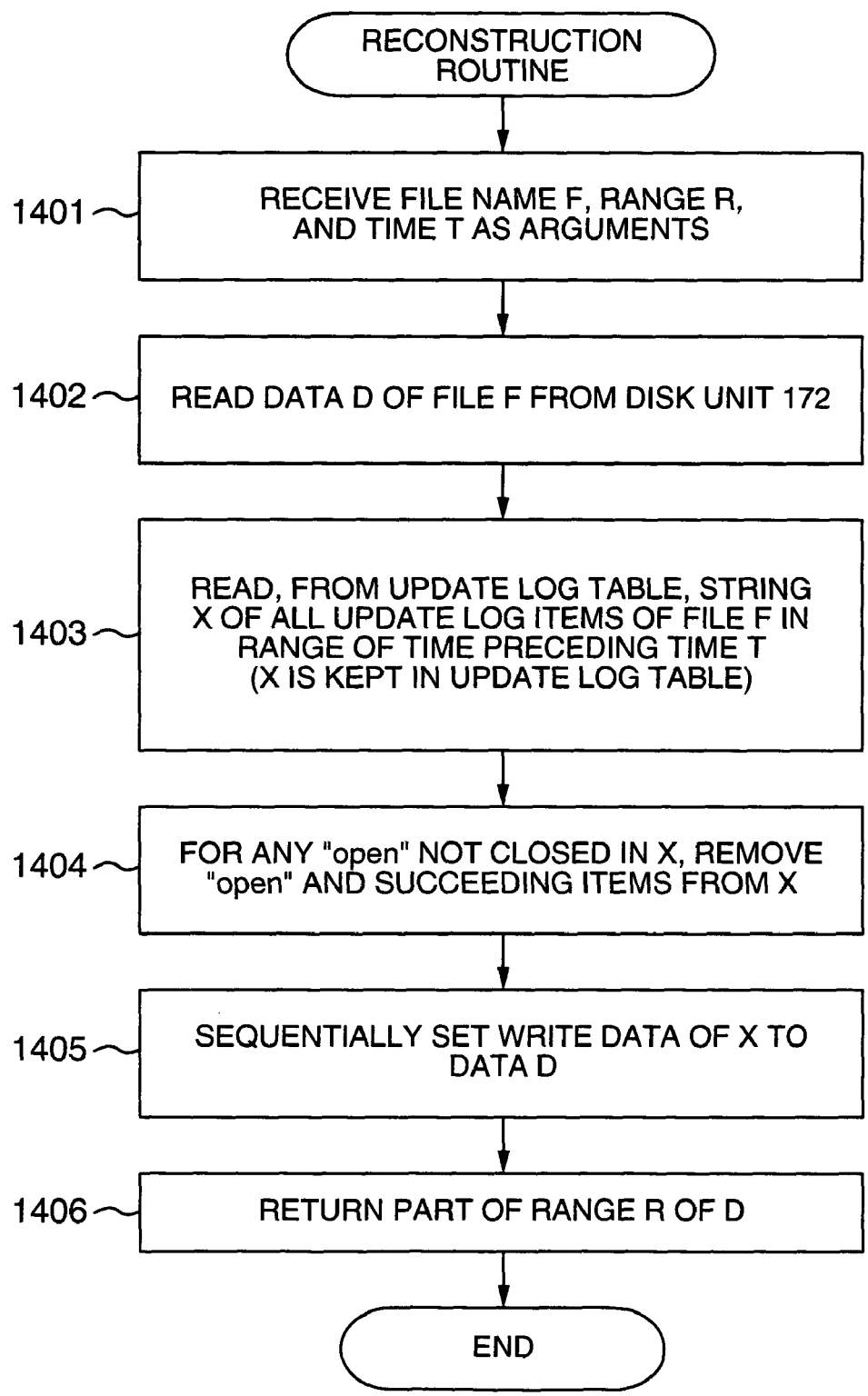
FIG. 14 is a flowchart of a reconstruction routine.

FIG. 14 shows a flowchart of the reconstruction routine 133. The routine 133 is called by the read routine 122 to process a read request for a past file. In step 1401, the routine 133 receives arguments from the call source routine, i.e., the read routine 122. The arguments are an objective file name F and a range R. In step 1402, the routine 133 reads data D of the file F created at a point of time one hour before. In step 1403, the routine 133 reads from the update log table 161 a string of all update log items of the file F created at a point of time before the time T. The routine 133 keeps the string X in the table 161. In step 1404, if the string X includes "open" not closed, the routine 133 removes the item of the "open" and subsequent items from the string X. In step 1405, the routine 133 reconstructs a file at the time T sequentially using the write data of the string X as the data D. In step 1406, the routine 133 returns part of the data D in the range R to the client computer 200.

FIG. 15 shows a flowchart of the restore routine 134. The routine 134 is called by the client computer 200, for example, at occurrence of failure in the mirrored disk 172 to restore the contents of the active disk 171 using the mirrored disk 172 and the update log table 161. In steps 1501 to 1505, the routine 134 sets the latest contents to the mirrored disk 172 using the logs delayed by the asynchronous mirroring. In step 1501, the routine 134 selects one of the file names F from the fields 164 of the update log table 161. In step 1502, the routine 134 obtains from the table 161 a string X of update log items of the file F created before the time T. In step 1503, if the string X includes "open" not closed, the routine 134 removes the item of "open" and subsequent items from the string X. In step 1504, the routine 134 sequentially records write data of the string X on the mirrored disk 172. In step 1505, the routine 134 makes a check to determine whether or not the table 161 includes a file to be processed. If such file is present, the process branches to step 1501 to repeatedly execute the processing. Otherwise, the process branches to step 1506. In step 1506, the routine 134 copies the overall contents of the mirrored disk 172 including the latest contents onto the active disk 171. In step 1507, the routine 134 deletes all entries from the table 161 to initialize the table 161.

FIG. 16 shows a flowchart of the open routine 123. The routine 123 processes a file open request from the client computer 200. In step 1601, the routine 123 receives a file name F as an argument from the computer 200. In step 1602, to process the request from the computer 200, the routine 123 opens the file F on the active disk 171. In step 1603, the routine 123 obtains the current time T for a subsequent step. In step 1604, the routine 123 calls the log accumulation routine 131. The routine 123 passes an update type "open", update time T, and an update file name F as arguments to the routine 131.

FIG. 17 shows a flowchart of the close routine 124. The routine 124 processes a file close request from the client computer 200. In step 1701, the routine 124 receives a file name F as an argument from the computer 200. In step 1702, to process the request from the computer 200, the routine 124 closes the file F on the active disk 171. In step 1703, the routine 124 obtains the current time T for a subsequent step. In step 1704, to implement the asynchronous mirroring, the routine 124 calls the log accumulation routine 131. The routine 124 passes an update type "close", update time T, and an update file name F as arguments to the routine 131.

As above, description has been given of the system configuration and the processing flow of the first embodiment. According to the embodiment, by selecting a file at a desired latest point of time, it is guaranteed to restore the file by the user's operation such that the application can use the file again.

Although the delay time of the mirroring has a fixed length in the embodiment, it is also possible to use a variable time length for the delay time. For example, when a file is closed, the mirroring is immediately completed.

2. Second Embodiment

Since the second embodiment is almost the same in the system configuration as the first embodiment, description thereof will be given by referring to FIG. 1. The second embodiment differs from the first embodiment in that the NAS apparatus 100 also accepts a new request, namely, a commit request.

Having received the commit request, the NAS apparatus 100 of the embodiment executes processing as if the apparatus 100 has successively received a close request and an open request. In the other points, the second embodiment executes processing in the same way as for the first embodiment.

An object of the second embodiment is to reduce the data loss for the following reasons.

For example, to exclusively use files, many application programs open files and use the files for a long period of time without closing the files. This occurs, for example, in a word processor. In this way of use, the file checkpoint interval becomes greater, and a large amount of data is lost in the NAS apparatus 100 of the first embodiment.

In the second embodiment, even a file is not closed, if the application explicitly issues a commit request in a state in which the contents of the file are consistent for the application, the checkpoint can be frequently established for the file being successively used for a long period of time.

An event for the application to issue the commit request occurs, for example, when the user instructs the word processor to save a file.

3. Third Embodiment

The system configuration of the third embodiment is almost the same as that of the first embodiment. However, the third embodiment differs from the first embodiment in that the NAS apparatus 100 forcibly closes a file when a predetermined time lapses from a predetermined point of time.

The NAS apparatus 100 of the third embodiment executes the processing for a file opened before when a predetermined period of time lapses (for example, ten hours) after the file is opened. That is, the apparatus 100 executes the processing as if a close request is received for the file. The other processing is the same as for the first embodiment.

An object of the third embodiment is to improve usability by preventing service interruption of the NAS apparatus 100.

The NAS apparatus 100 of the first embodiment continuously accumulates update log until the file is closed. As a result, the update log table 162 is used up in some cases. In such a case, any write request for a file cannot be processed, and hence the service of the NAS apparatus 100 is interrupted until another close request is received.

According to the third embodiment, by limiting the stay time of the update log, it is prevented that the service is eternally interrupted. A file imposing a heavy load on the backup is removed from the object of the backup. Therefore, the backup can be achieved for the other files and the service is kept continued. The backup of the present embodiment is quite effective in a job in which the continuous service is more important than the restoration of a file to be opened for a long period of time.

4. Fourth Embodiment

The system configuration of the fourth embodiment is almost the same as that of the first embodiment. However, the fourth embodiment differs from the first embodiment in that the NAS apparatus 100 uses one of the disk units 170 as a swap disk unit.

The NAS apparatus 100 of the fourth embodiment writes any update log item of the update log table 162 on the swap disk unit when a predetermined period of time lapses after the item is written in the table 162. As a processing object of the update reflection routine 132, the update log table 161 as well as the swap disk unit are available. The other processing is the same as for the first embodiment.

An object of the fourth embodiment is to reduce the data loss by increasing the capacity of the update log table 161 to accumulate an increased number of update log items.

In general, a cache (memory) is less in the capacity than a disk. When compared with the cache 160, the disk unit 170 can keep a larger update log table 161. On the other hand, the disk is less in the operation speed than the cache. When the processing to immediately store on the mirrored disk 172 the update log written on the swap disk unit 170 occurs frequently, performance of the system is remarkably reduced. However, in the present embodiment, such processing occurs less frequently and hence the performance is not deteriorated for the following reasons. An objective file of update log to be written on the swap disk unit is kept opened for a long period of time and hence is not closed in the near future. That is, it can be expected that the update log is not immediately written on the mirrored disk 172.

5. Fifth Embodiment

The system configuration of the fifth embodiment is almost the same as that of the first embodiment. However, the fifth embodiment differs from the first embodiment in that the fifth embodiment includes an asynchronous mirroring section.

The NAS apparatus 100 of the fifth embodiment includes the asynchronous mirroring section implemented by hardware to write on the mirrored disk 172 data stored on the active disk 171 after the data is kept stayed in the cache 160 for a predetermined period of time. When accessing the update log in the update log table 161, the mirror control program 130 uses the field 167 to keep a position of update log data, not the update log data itself. The position indicates a position at which the asynchronous mirroring section writes the log data. The other processing is the same as for the first embodiment.

An object of the fifth embodiment is to improve performance of the NAS apparatus 100 by reducing the load of the processor 110.

The primary processing executed by the processor 110 to implement the backup of the first embodiment is the update data copy. This considerably influences the performance of the NAS apparatus 100.

According to the fifth embodiment, by passing the simple data copy processing to a high-speed hardware system, the processor 110 can achieve its inherent service at a high speed.

6. Sixth Embodiment

The system configuration of the sixth embodiment is almost the same as that of the first embodiment. However, the sixth embodiment differs from the first embodiment in that the backup of the NAS apparatus 100 is conducted for each directory, not for each disk.

The NAS apparatus 100 of the sixth embodiment stores a predetermined backup object directory. Having received an access request to access a file, the file control program 130 compares a file name of the file with the items of the directory. If the file name is not an object of the backup, the program 130 does not call the mirror control program. The other processing is the same as for the first embodiment.

An object of the sixth embodiment is to conduct the backup for more important files by controlling the backup range in detail.

In the NAS apparatus 100 of the first embodiment, the area of the cache 160 is subdivided into an area of the update log table 161 for the backup and a cache area to increase the disk access speed. To implement the backup, the primary processing executed by the processor 110 is the update data copy. This considerably influences the performance of the NAS apparatus 100. To more frequently conduct the backup operation, it is required to increase the update log table 161. This resultantly reduces the cache area and hence deteriorates disk access performance. The data copy processing occurs more frequently and performance of the processor is deteriorated. Resultantly, performance of the NAS apparatus 100 is remarkably deteriorated.

According to the sixth embodiment, the processing speed of the NAS apparatus can be increased by limiting the backup object to important data.

7. Seventh Embodiment

The system configuration of the seventh embodiment is almost the same as that of the first embodiment. However, the seventh embodiment differs from the first embodiment in that the seventh embodiment uses only one disk unit for the backup, not two disk units therefor.

The NAS apparatus 100 of the embodiment does not use the active disk unit 171. When writing data in a file, the system writes data via the update log table 161 only on the mirrored disk 172. That is, data is not written on the active disk 171. When it is desired to read, to open, and to close a file, the reconfiguration routine 133 is used to create a file at the present point of time. The restore operation is not conducted. The other processing is the same as for the first embodiment.

An object of the seventh embodiment is to lower the cost by reducing the disk capacity for the backup.

In the NAS apparatus 100 of the first embodiment, it is required to dispose a mirrored disk 172 having the same capacity as that of the active disk 171. This is necessary to execute the restore processing. However, if the object of the system is only the restoration of a past file, the configuration is redundant.

According to the seventh embodiment, the required disk capacity is reduced to one half that of the first embodiment and hence the cost is reduced.

The update log table 161 is stored in the cache 160 in the seventh embodiment. However, this is also applicable to an NAS apparatus 100 in which the update log table 161 is stored on a disk 170 separately prepared.

The update log table 161 is stored in the cache 160 in the seventh embodiment. However, this is also applicable to an NAS apparatus 100 in which the update log table 161 is stored on the mirrored disk 172.

As above, description has been given of the first to seventh, it is also possible to implement embodiments by appropriately combining these embodiments. For example, in the second embodiment, there may be implemented a backup operation which uses the timeout function of the third embodiment.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. The information processing system An information processing system, comprising:

a processor;

a first storage apparatus which can be accessed by the processor;

a second storage apparatus which can be accessed by the processor; and a third storage apparatus, wherein the processor includes a control unit for conducting a backup operation from the first storage apparatus to the second storage apparatus, the third storage apparatus includes an update log of the first storage apparatus and file open and close information for the first storage apparatus, and the control unit conducts a rewriting operation in the second storage apparatus using the update log and the file open and close information of the first storage apparatus, wherein the control unit prevents a write operation of a file, which is not closed after the file is opened, in the second storage apparatus using the update log of the first storage apparatus and information regarding an opening and closing time of the file of the first storage apparatus.

2. The information processing system according to claim 1, wherein the update log of the first storage apparatus includes a location to store information indicating contents of update, and time of update.

3. The information processing system according to claim 1, wherein the control unit extracts, from the update log, an update log item having an update time at least a predetermined time before and conducts the back up operation using the extracted update log items.

* * * * *